United States Patent
Javidi et al.

(10) Patent No.: US 9,197,877 B2
(45) Date of Patent: Nov. 24, 2015

(54) SMART PSEUDOSCOPIC-TO-ORTHOSCOPIC CONVERSION (SPOC) PROTOCOL FOR THREE-DIMENSIONAL (3D) DISPLAY

(71) Applicant: UNIVERSITY OF CONNECTICUT

(72) Inventors: Bahram Javidi, Storrs, CT (US); Manuel Martinez-Corral, Betera (ES); Raul Martinez-Cuenca, Torrente (ES); Genaro Saavedra-Tortosa, Manises (ES); Hector Navarro Fructuoso, Alicante (ES)

(73) Assignees: UNIVERSITAT DE VALÉNCIA, Valencia (ES); UNIVERSITY OF CONNECTICUT, Farmington, CT (US)

( * ) Notice: Subject to any disclaimer, the term of this patent is extended or adjusted under 35 U.S.C. 154(b) by 421 days.

(21) Appl. No.: 13/683,507

(22) Filed: Nov. 21, 2012

(65) Prior Publication Data
US 2013/0128008 A1    May 23, 2013

Related U.S. Application Data

(60) Provisional application No. 61/562,785, filed on Nov. 22, 2011.

(51) Int. Cl.
| | | |
|---|---|---|
| H04N 13/02 | (2006.01) | |
| G06T 3/00 | (2006.01) | |
| H04N 13/00 | (2006.01) | |
| G02B 27/22 | (2006.01) | |

(52) U.S. Cl.
CPC ............ *H04N 13/0203* (2013.01); *G02B 27/22* (2013.01); *G06T 3/00* (2013.01); *H04N 13/0007* (2013.01)

(58) Field of Classification Search
None
See application file for complete search history.

(56) References Cited

U.S. PATENT DOCUMENTS

| | | | |
|---|---|---|---|
| 2004/0247236 A1* | 12/2004 | Yoshimura et al. | 385/16 |
| 2005/0024736 A1* | 2/2005 | Bakin et al. | 359/663 |
| 2013/0038941 A1* | 2/2013 | Pesach et al. | 359/619 |

OTHER PUBLICATIONS

Song, Yong-Wook, Bahram Javidi, and Fushou Jin. "3D object scaling in integral imaging display by varying the spatial ray sampling rate." Optics express 13.9 (2005): 3242-3251.*

(Continued)

*Primary Examiner* — Mark Zimmerman
*Assistant Examiner* — Vu Nguyen
(74) *Attorney, Agent, or Firm* — Ohlandt, Greeley, Ruggiero & Perle, L.L.P.

(57) ABSTRACT

A smart pseudoscopic to orthoscopic conversion (SPOC) protocol, and method for using the SPOC protocol for three-dimensional imaging, are disclosed. The method allows full control over the optical display parameters in Integral Imaging (InI) monitors. From a given collection of elemental images, a new set of synthetic elemental images (SEIs) ready to be displayed in an InI monitor can be calculated, in which the pitch, microlenses focal length, number of pixels per elemental cell, depth position of the reference plane, and grid geometry of the microlens array (MLA) can be selected to fit the conditions of the display architecture.

15 Claims, 12 Drawing Sheets

- Integral image: array of elemental images
- $x_p$: coordinate of the center of the pixel (not a part of the SEI, only a coordinate)
- Blue dotted line: straight line that connects the center of the pixel and the pinhole.

(56) References Cited

OTHER PUBLICATIONS

Martinez-Corral, Manuel, et al. "Formation of real, orthoscopic integral images by smart pixel mapping." Optics Express 13.23 (2005): 9175-9180.*

Okano, et al., "Real-time pickup method for a three-dimensional image based on integral photography", Applied Optics, (Mar. 1, 1997), vol. 36, No. 7, pp. 1598-1603.

Martinez-Corral, et al., "Formation of real, orthoscopic integral images by smart pixel mapping", Optical Society of America, (Nov. 14, 2005 ), vol. 13, No. 23, Optics Express, pp. 9175-9180.

Navarro, et al.,"3D integral imaging display by smart pseudoscopic-to-orthoscopic conversion (SPOC)", Optical Society of America, (Dec. 6, 2010), vol. 18, No. 25, Optics Express, pp. 25573-25583.

\* cited by examiner

- Integral image: array of elemental images
- $x_s$: coordinate of the center of the pixel (not a part of the SEI, only a coordinate)
- Blue dotted line: straight line that connects the center of the pixel and the pinhole.

SMART PSEUDOSCOPIC-TO-ORTHOSCOPIC CONVERSION (SPOC) PROTOCOL FOR THREE-DIMENSIONAL (3D) DISPLAY

CROSS-REFERENCE TO RELATED APPLICATION

This application claims the benefit of U.S. Provisional Application No. 61/562,785, filed on Nov. 22, 2011, which is incorporated herein by reference.

BACKGROUND OF THE DISCLOSURE

1. Field of Disclosure

Three-dimensional (3D) imaging by Smart Pseudoscopic-to-Orthoscopic Conversion (SPOC) is disclosed that creates new sets of synthetic elemental images (SEIs) that are fully adapted to Integral Imaging (InI) display monitors, and allows full control of microlens array (MLA) display parameters.

2. Description of Related Art

Stereoscopic and auto-stereoscopic monitors usually produce visual fatigue to an observer due to the convergence-accommodation conflict (i.e., the discrepancy between actual focal distance and depth perception). An attractive alternative to these technologies is Integral Imaging (InI), which is a three-dimensional (3D) imaging technique that provides auto-stereoscopic images that can be observed without special glasses or goggles worn by the observer.

The InI concept is that one can create a 3D image of an object by acquiring many two-dimensional (2D) elemental images of it from different positions, which can be readily achieved by using a microlens array (MLA) as the camera lens. When the elemental images are projected onto a 2D display placed in front of an MLA, the different perspectives are integrated as a 3D image. Every pixel of the display generates a conical ray bundle when it passes through the array. The intersection of many ray bundles produces a local concentration of light density that permits object reconstruction. The resulting scene is perceived as 3D by the observer, whatever his or her position relative to the MLA. And since the InI monitor truly reconstructs the 3D scene, the observation is produced without special glasses or goggles, with full parallax, and with no visual fatigue.

A problem encountered with InI for 3D displays is the pseudoscopic (or depth reversed) nature of the displayed images when the captured elemental images do not receive pixel pre-processing. Okano et al. proposed a digital method to display orthoscopic scenes (Okano, "Real time pickup method for a three-dimensional based on integral photography," *Appl. Opt.* (1997), vol. 36(7), pp. 1598-1603). While simple and efficient, Okano's method has the disadvantage that it provides only virtual reconstructions; i.e., the 3D scene appears inside the monitor.

More recently, a method was reported for creation of a set of synthetic elemental images (SEIs) that permit orthoscopic, real (or floating outside of monitor) reconstruction of the 3D scene by a digital technique, Smart Pixel Mapping (SPIM) (M. Martinez-Corral et al., "Formation of real, orthoscopic integral images by smart pixel mapping," *Opt. Express* (2005), vol. 13(23), pp. 9175-9180). SPIM provided real, non-distorted, orthoscopic integral images by direct pickup. By proper mapping of pixels, SPIM allowed the creation of a set of SEIs which, when placed in front of an MLA that is identical to the one used in the capture, produces the reconstruction of a real and orthoscopic image at the same position, and with the same size, as the original 3D object. However, SPIM was limited by the fact that the method allows only a fixed position for the reconstructed scene, and also that the number of microlenses (and their pitch) cannot be changed.

SUMMARY OF THE DISCLOSURE

The present disclosure provides a method of transformation of a pseudoscopic image to an orthoscopic image for 3D viewing, by creating sets of synthetic elemental images (SEIs) that are fully adapted to the display monitor characteristics.

The SEIs of the present method are created by the following three processes, in sequence: simulated display, synthetic capture (also called "virtual capture"), and homogeneous scaling. The array of captured elemental images is first used as the input. Synthetic capture is simulated to occur through an array of pinholes. The position of the array, pitch, gap, and number of pixels are arbitrarily assigned to match the monitor characteristics. Finally, homogeneous scaling adapts the size of the SEIs to the InI monitor.

The protocol and method of the present disclosure permit selection of the MLA display parameters, such as the pitch, focal length, and size of the MLA, as well as the depth position and size of the reconstructed images, and even MLA geometry.

The protocol and method of the present disclosure address the structural differences between the capture setup and the display monitor when projecting integral images in a monitor. They also provide better focal distance and depth perception, to reduce visual fatigue of an observer.

DETAILED DESCRIPTION OF THE DISCLOSURE

The present disclosure provides a protocol and a method for transformation of pseudoscopic images to orthoscopic images, with full control over the display parameters so that one can generate a set of synthetic elemental images (SEIs) that accommodate the characteristics of the Integral Imaging monitor.

As used herein, the protocol is called Smart Pseudoscopic to Orthoscopic Conversion (SPOC).

SPOC permits control over the depth and size of the reconstructed three-dimensional (3D) scene. SPOC is a pixel mapping protocol that permits the user to select the display parameters, such as the pitch, focal length, and the size of the microlens array (MLA), the depth position and size of the reconstructed images, and even the geometry of the MLA.

SPOC also permits the creation of new sets of synthetic elemental images (SEIs) that are fully adapted to the display monitor characteristics.

Figure 1:
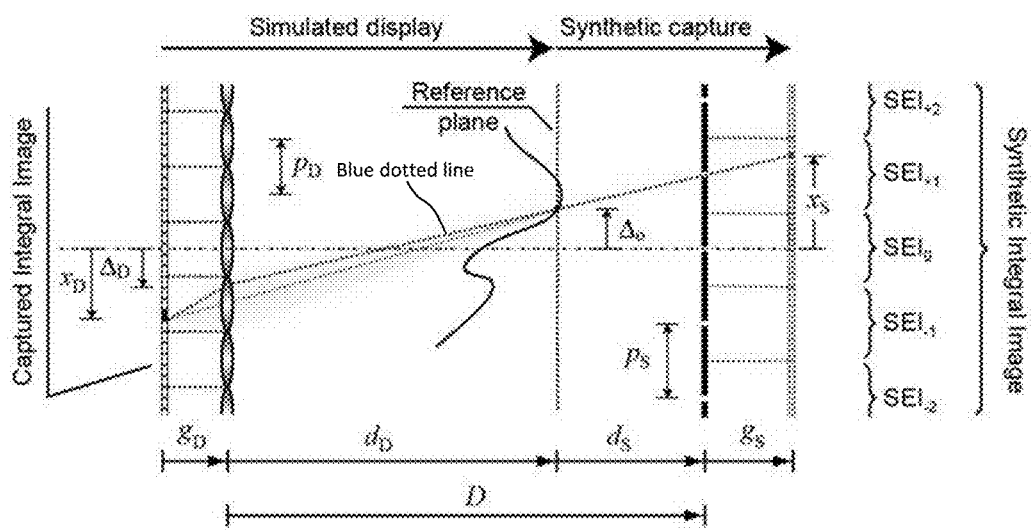
FIG. 1 is a diagram that illustrates calculation of a synthetic integral image for transformation of a pseudoscopic image to an orthoscopic image for 3D viewing by smart pseudoscopic-to-orthoscopic conversion (SPOC) of the present disclosure.

Referring now to the drawings, and in particular, to FIG. 1, an exemplary embodiment of the protocol and method of the present disclosure are shown in the schematic diagram. The SEIs are calculated as shown in the schematic diagram in FIG. 1 by the SPOC protocol.

The SPOC protocol can be explained as the result of applying a cascade of three processes: the simulated display, the synthetic capture, and the homogeneous scaling, which are described below.

In the first process of SPOC, the simulated display, the input is the set of elemental images captured experimentally. The pitch, the gap, and the focal length of the MLA are equal to those used in the experimental capture. This simulated display permits the reconstruction of the original 3D scene in the same position, and with the same scale. In FIG. 1, for example, the pixel of the synthetic integral image (indicated by the dotted blue line) stores the same value as the pixel of the captured integral image.

The second process is the synthetic capture, which is done through an array of pinholes (PA). To give SPOC the maximum generality, for the synthetic capture:

(a) the synthetic PA is placed at an arbitrary distance D from the display MLA;
(b) arbitrary values are assigned for pitch, $p_S$, and gap, $g_S$, to the synthetic PA—note that this selection will determine also the size of the final image; and
(c) the number of pixels, $n_S$, is fixed, also arbitrarily, per synthetic elemental image and the total number of elemental images $N_S$.

Note that the value of parameter $d_S$ determines the position of the reference plane of the image displayed by the Integral Imaging display monitor. A smart selection of $d_S$ will permit, when displaying the SEIs in an actual Integral Imaging display monitor, the observation of either orthoscopic real or virtual 3D images. A positive value of $d_S$ corresponds to a floating real 3D image. A negative value of $d_S$ corresponds to a virtual reconstruction.

The third step, the homogeneous scaling, can adapt the size (scale) of the SEIs to the final Integral Imaging (InI) monitor. In this step, both the pitch and the gap are scaled by the same factor. The only constraint in this step is that the final SEIs must be ready to be used in a realistic InI monitor, and therefore the value of the scaled gap should be equal to the focal length of the monitor microlens.

As used herein, "protocol" means a sequence of events or operations that are carried out or applied in a particular order. Protocol can also mean a method or a process having steps that are carried out or applied in a particular order, such that an output of a prior step is an input of the next step.

For simplicity, FIG. 1 is drawn in the one-dimensional case. The extrapolation of the forthcoming theory to two dimensions is trivial. There exists, however, a case of great interest in which the extrapolation is not trivial—the case in which the geometry of synthetic array is different from that of the image capture stage. This happens, for example, when one of the arrays is rectangular and the other hexagonal.

Next, the pixels of each SEI are calculated. The key insight to this method is that, given a pixel of one SEI, to find the pixel of the captured integral image that maps to it. To do this, one first back-projects the coordinate, $x_S$, of the center of the $m^{th}$ pixel of the $j^{th}$ SEI through its corresponding pinhole (i.e., the blue dotted line in FIG. 1).

The coordinate of the pixel can be written as equation (1):

$$x_S = jp_S + m\frac{p_S}{n_S} \quad (1)$$

The back-projection through the pinhole permits one to calculate the intersection of the blue line with the reference plane, as in equation (2):

$$\Delta_o = \left(1 + \frac{d_S}{g_S}\right)jp_S - \frac{d_S}{g_S}x_S \quad (2)$$

and also the interface with the display MLA, in equation (3):

$$\Delta_D = \left(1 + \frac{D}{g_S}\right)jp_S - \frac{D}{g_S}x_S \quad (3)$$

The index of capture microlens where the blue dotted line impacts can be calculated by equation (4):

$$i_{jm} = \text{Round}\left[-\frac{D}{p_D g_S}\left(jp_S + m\frac{p_S}{n_S}\right) + \frac{g_S + D}{p_D g_S}jp_S\right] \quad (4)$$

$$= \text{Round}\left[\frac{p_S}{p_D}j - \frac{p_S}{p_D}\frac{D}{g_S}\frac{m}{n_S}\right]$$

The last step is to find the mapping pixel. To this end, one calculates the coordinate of the point that is the conjugate, through the impact microlens, of point $\Delta_o$ by equation (5):

$$x_D = \left(1 + \frac{g_D}{D - d_S}\right) p_D i_{jm} - \frac{g_D}{g_S} \frac{g_S + d_S}{D - d_S} j p_S + \frac{g_D}{g_S} \frac{d_S}{D - d_S} x_S \quad (5)$$

Finally, one can calculate the index of the $l^{th}$ pixel within the $i^{th}$ elemental cell as equation (6):

$$l_{jm} = \text{Round}\left[\frac{g_D}{D - d_S} n_D i_{jm} + \frac{g_D}{g_S} \frac{p_S}{p_D} \frac{n_D}{D - d_S}\left(d_S \frac{m}{n_S} - j p_S\right)\right] \quad (6)$$

Thus, the pixel values of the SEIs can be obtained from the captured integral image by the mapping in equation (7):

$$I^S_{jm} = I^D_{il} \quad (7)$$

To demonstrate the generality of the SPOC protocol of this method, one can revisit two classical algorithms for pseudoscopic to orthoscopic (PO) conversion and demonstrate that they can be considered as particular cases of the SPOC protocol.

A simple method for the PO conversion reported by Okano et al. proposed rotating each elemental image by 180° around the center of the elemental cell. Then, the rotated elemental images are displayed at a distance $g_S = g_D - 2f^2/(d_D - f)$ from an MLA similar to the one used in the capture. This procedure permits the reconstruction of virtual, orthoscopic 3D scene. Note however that $g_S \neq g_D$, and therefore the final reconstructed image is slightly distorted since it has shrunk in the axial direction.

Figure 2:
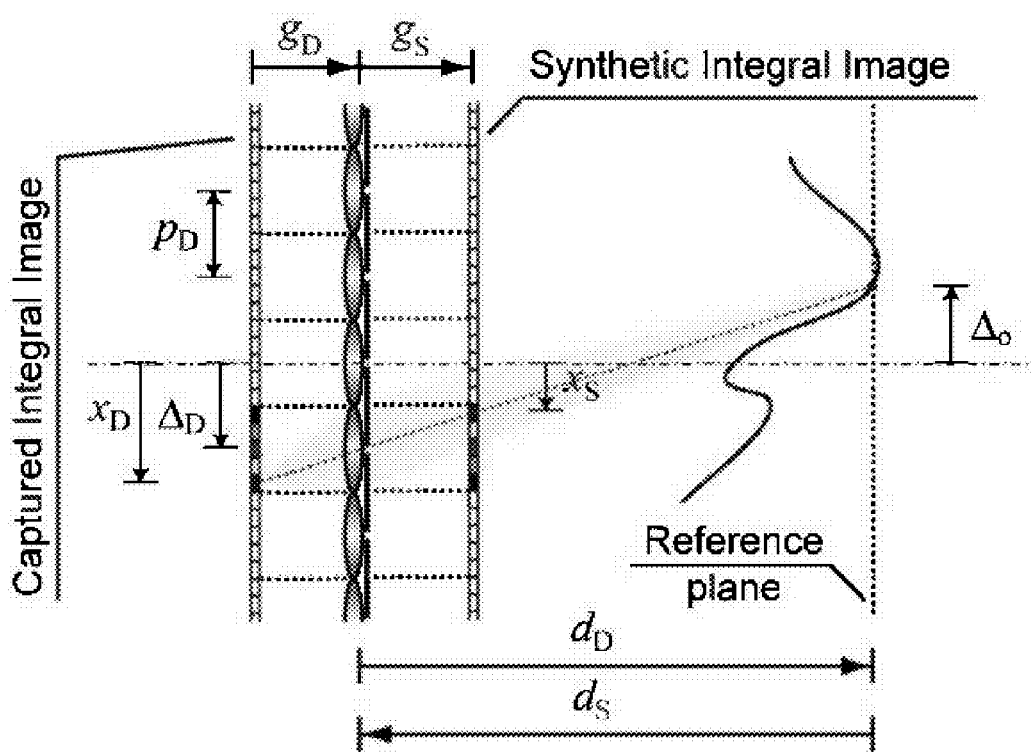
FIG. 2 is a diagram that illustrates calculation of a synthetic integral image for pseudoscopic to orthoscopic (PO) conversion where the following values are input: $D=0$ (and therefore $d_S=-d_D$), $g_S=g_D$, $p_S=p_D$, and $n_S=n_D$, with $n_S$ being the number of pixels that compose the SEI and the number of pixels that compose any of the elemental images captured experimentally.

To reproduce Okano's method, the following values (see FIG. 2): $D=0$ (and, therefore, $d_S = -d_D$); $g_S = g_D$; $p_S = p_D$, and $n_S = n_D$ are used as the input of the SPOC protocol. FIG. 2 shows the schematic diagram for the calculation of Okano's synthetic integral image.

Introducing such values into equations (4) and (6), one finds that:

$$i_{jm} = j \quad (8)$$

and $$l_{jm} = \text{Round}\left[-\frac{g_D}{d_S} n_D i - m + n_D \frac{g_S}{d_S} j\right] = -m \quad (9)$$

Note that the SPOC result is, however, slightly different from the one reported by Okano et al. While in their case, $f_S = f_D$ but $g_S \neq g_D$, in the present case that $g_S = g_D$, and that $f_S = g_S$. This fact gives the SPOC protocol a slight advantage, since it permits the reconstruction of 3D scene without any distortion, i.e., with the same magnification in the axial and in the lateral direction, and also free of facet braiding. One the other hand, one can use the SPOC protocol to produce, in addition to the PO conversion, other changes to adapt the integral image to the display grid geometry.

In the symmetric case, which was the case for which the author's previous SPIM protocol (described above) was created, again, $g_S = g_D$; $p_S = p_D$, and $n_S = n_D$, but now $D = 2d_D$ (and therefore $d_S = d_D$), besides:

$$n_D = n_S = \frac{2d_D}{g_D} \quad (10)$$

This leads to the results in equations (11) and (12):

$$i_{jm} = j - m \quad (11)$$

$$l_{jm} = -m \quad (12)$$

Note that these equations are the same as reported for the SPIM protocol above, although with different appearance due to the choice of different label criteria.

To demonstrate the versatility of SPOC, it was applied to generate SEIs ready to be displayed in display architectures that are very different from the parameters used in the capture stage.

Figure 3:
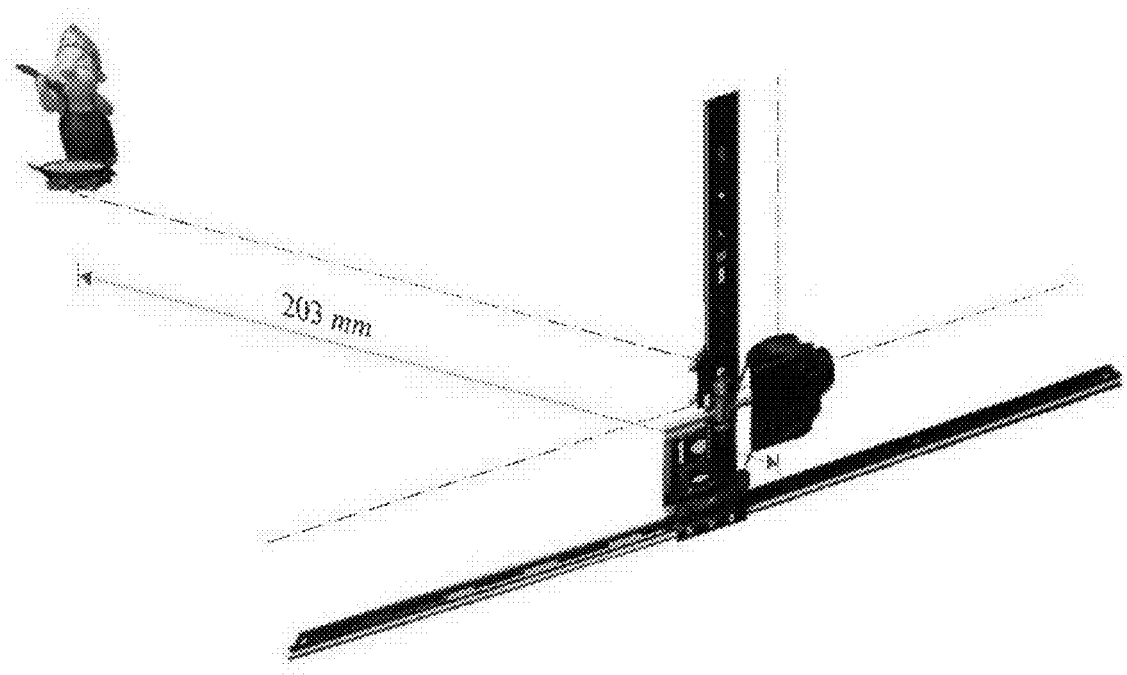
FIG. 3 is a diagram that illustrates an experimental set up for the acquisition of the set of elemental images of a 3D scene of the present disclosure.

As shown in FIG. 3, for the capture of the elemental images, a black background was prepared over a 3D scene of a doll (a cook preparing paella).

For the acquisition of the elemental images, instead of using an array of digital cameras, the so-called synthetic aperture method, in which all of the elemental images are picked up with only one digital camera that is mechanically translated, was used.

The digital camera was focused at a distance of one meter. The camera parameters were fixed to $f=10$ mm and $f_{l\#}=22$. The depth of field was large enough to obtain sharp pictures of the doll, which was placed at a distance of $d=203$ mm from the camera. The gap for the capture was, then, $g=10$ mm.

A set of $N_H=17 \times N_V=11$ images with pitch $P_H=22$ mm and $P_V=14$ mm was obtained. Note that the pitch is slightly smaller than the size of the CMOS sensor (22.2 mm×14.8 mm), thus any captured picture was cropped slightly in order to remove the outer parts. In this way, the integral image consisting of 17 H×11 V elemental images of 22×14 mm and $n_H=2256 \times n_V=1504$ pixels each could be composed.

Figure 4:
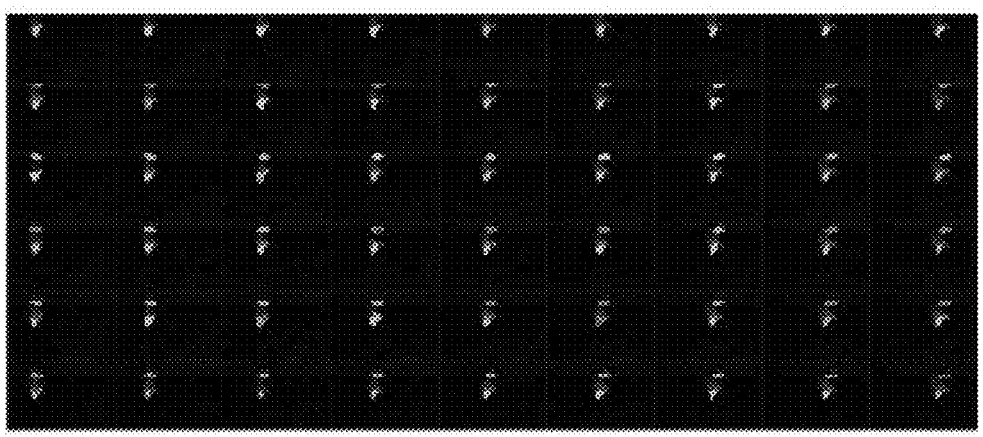
FIG. 4 illustrates a portion of the set (i.e., a subset) of elemental images obtained after the capture experiment and cropping of the pictures, where the elemental images are the input for the SPOC protocol of the present disclosure.

FIG. 4 shows a portion of the set (i.e., a subset) of elemental images obtained after the capture experiment and the cropping of the pictures. It is the elemental images, such as those shown in FIG. 4, that serve as the input for the SPOC protocol of the present disclosure.

For the calculation of the set of SEIs, and with the aim of reducing the computing time, the elemental images to $n_{DH}=251$ px and $n_{DV}=161$ px were resized. Then the synthetic parameters were fixed to: $d_S = d_D/2 = 101.5$ mm, $g_S = 3.75$ mm, $p_{SH} = p_{SV} = 1.25$ mm, $n_{SH} = n_{SV} = 19$ px, and $N_{SH} = N_{SV} = 151$ microlenses.

Figure 5A:
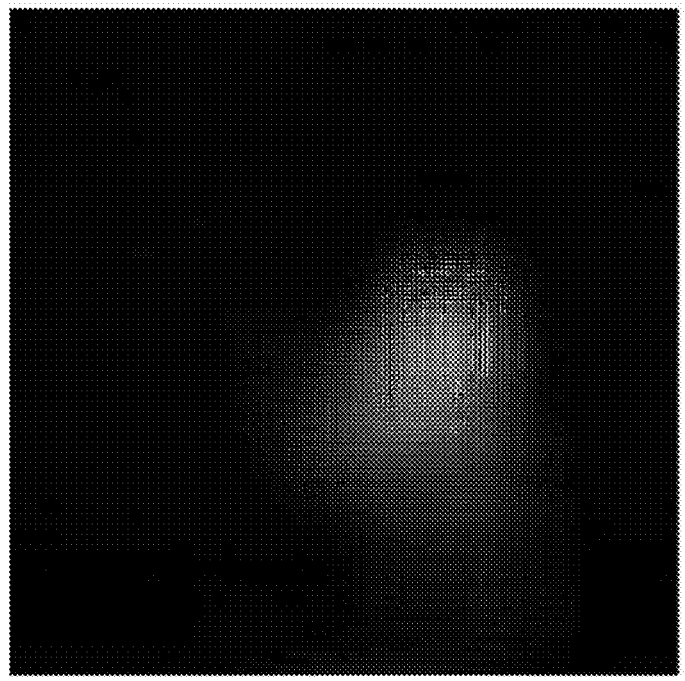
FIG. 5A illustrates a collection of 151×151 synthetic elemental images (SEIs) obtained after the application of the SPOC protocol of the present disclosure.
Figure 5B:
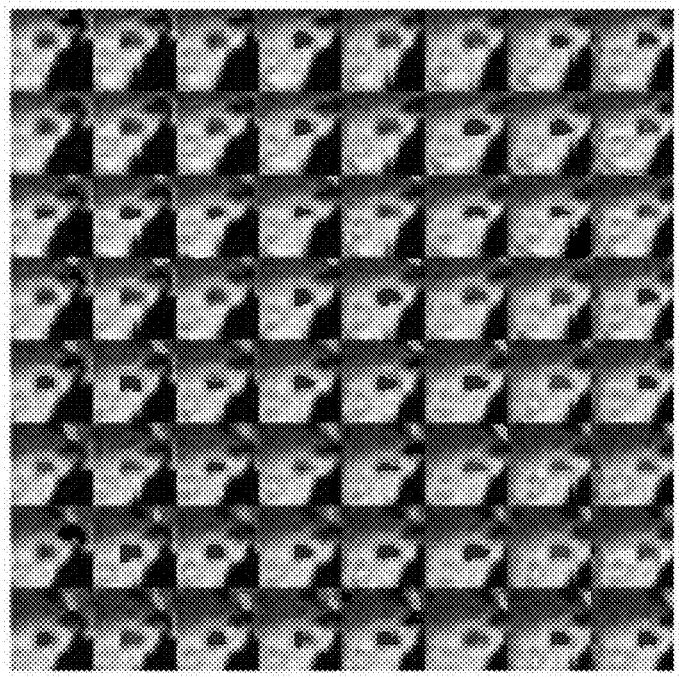
FIG. 5B provides an enlarged view of the central SEIs shown in FIG. 5A.

FIG. 5A and FIG. 5B show the set of calculated SEIs. Note that the number of elemental images has increased substantially, which now are square and arranged in square grid. FIG. 5A shows a collection of 151×151 SEIs obtained after the application of the SPOC protocol. FIG. 5B is an enlarged view of the central SEIs.

Finally, the third step of SPOC was applied, and scaled the corresponding parameter by a factor of 1.25, so that $g_S = 3.0$ mm, $p_{SH} = p_{SV} = 1.0$ mm, and therefore $d_S = 81.2$ mm. With this final set of SEIs, two visualization experiments were performed: the first one simulated with the computer, and the second one real in our laboratory.

Figure 6A:
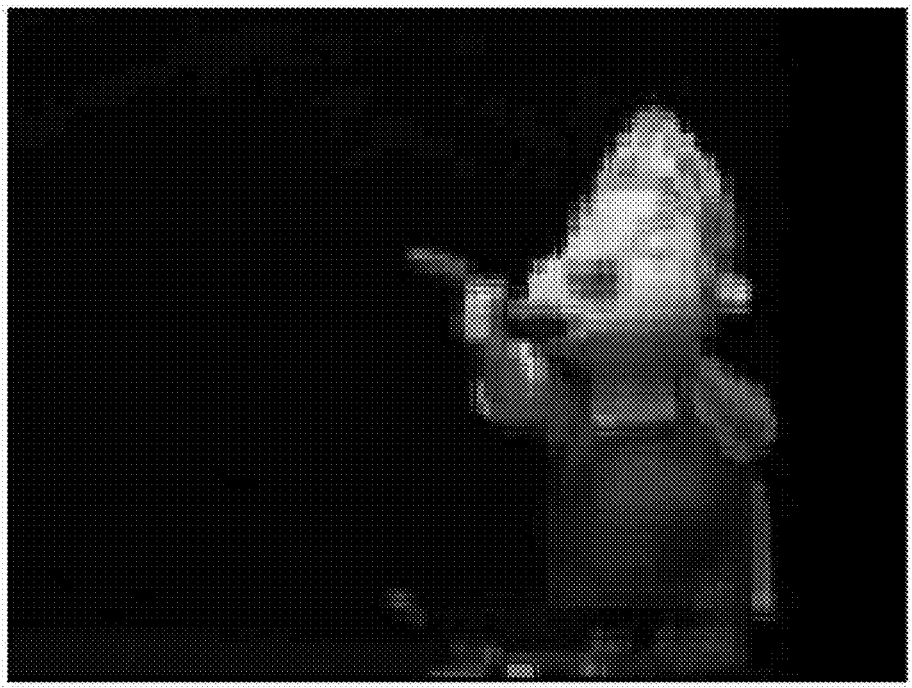
FIG. 6A and FIG. 6B illustrate two perspectives of a 3D reconstructed scene, as seen by an observer placed at a distance $L=700$ mm.
Figure 6B:
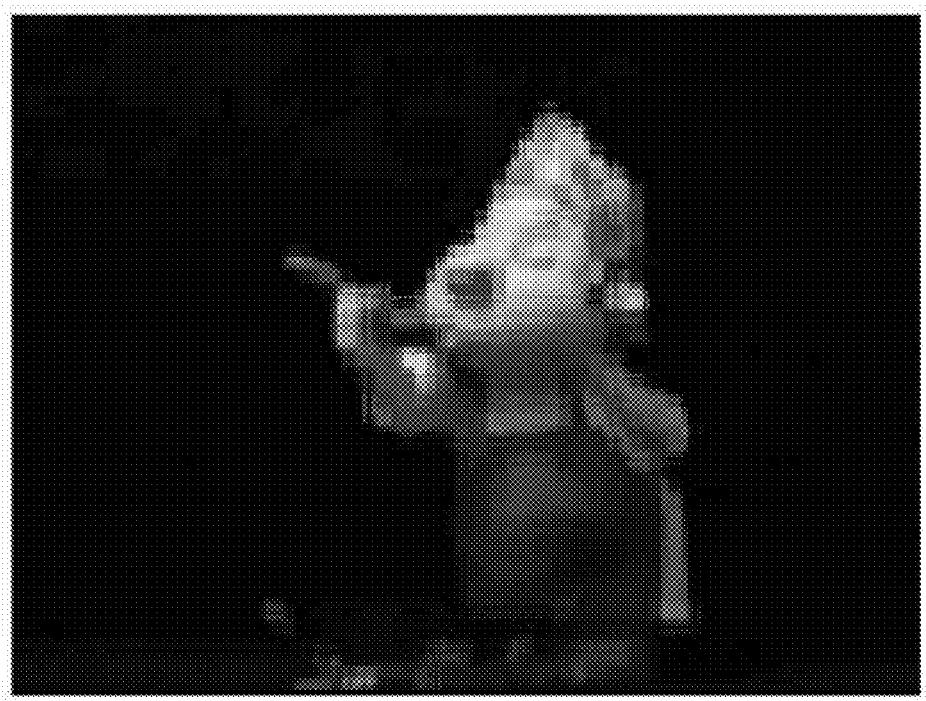

For the simulated visualization experiment, the calculation were done assuming a virtual observer placed at a distance $L=700$ mm from the MLA. The visualization calculations were performed following the protocol described previously. FIG. 6A and FIG. 6B show the result of the visualization simulation, providing two perspectives of the 3D reconstructed scene.

Next, the optical visualization experiment was performed. To this end, the SEIs were first printed on photographic paper with a high-resolution inkjet printer. The InI display monitor was equipped with an array of 151×151 microlenses, arranged in square grid, with pitch $p=1.0$ mm and $f=3.0$ mm. Then the SEIs were placed at a distance $g=3.0$ mm from the MLA, as shown in FIG. 7.

Figure 7:
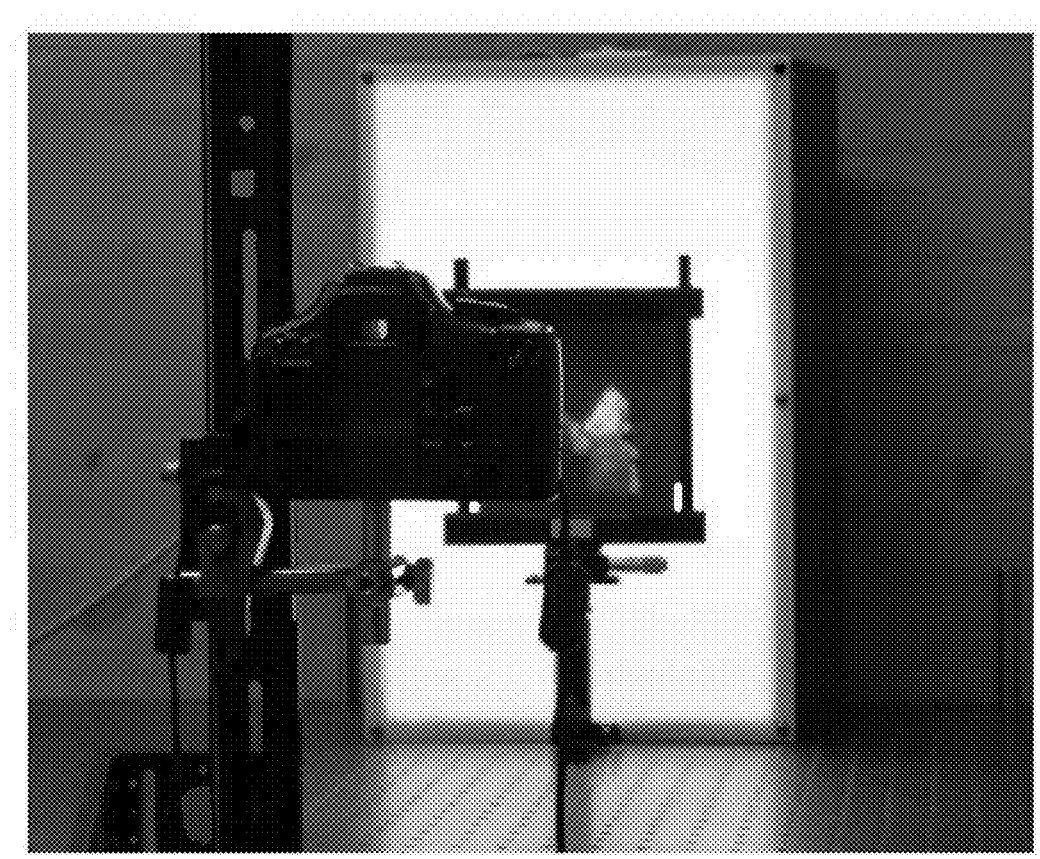
FIG. 7 illustrates an experimental set-up for the observation of the Integral Imaging monitor, where the digital camera can be displaced horizontally in steps of 10 mm to record different perspectives of the displayed 3D scene.
Figure 8A:
FIG. 8A and FIG. 8B illustrate two perspectives of the 3D scene displayed in the real experiment, showing the captured perspectives photographed by the digital camera in FIG. 7.
Figure 8B:

FIG. 7 shows the experimental setup for the observation of the InI monitor. After displacing horizontally the digital camera in steps of 10 mm, 20 different perspectives of the displayed 3D scene were recorded. The digital camera was placed at L=700 mm. The captured perspectives are shown in FIG. 8A and FIG. 8B, which show two perspectives of the 3D scene displayed in the real experiment.

It is now demonstrated that the SPOC protocol permits creating, from a low number of elemental images, a new set of SEIs ready to be displayed in an InI monitor equipped with an MLA composed by a much higher number of microlenses. The displayed image is orthoscopic, and is displayed at a shorter distance from the monitor.

Next, as proof of the flexibility of the SPOC protocol, the SEIs were calculated for a display geometry that is essentially different from the one used in the capture stage, but that is very common in 3D display applications—the case where in which the display microlenses are arranged in a hexagonal grid. For the application of the SPOC protocol, microlenses with diameter $\phi_S=1.0$ mm and focal length $f_S=3.0$ mm were considered. The depth distance to the MLA was fixed as $d_S=20.3$ mm. The SPOC was applied to calculate up to 24462 hexagonal synthetic elemental images (the dimensions of the hexagonal MLA were 151×152 mm), which are shown in FIG. 9A and FIG. 9B.

Figure 9A:
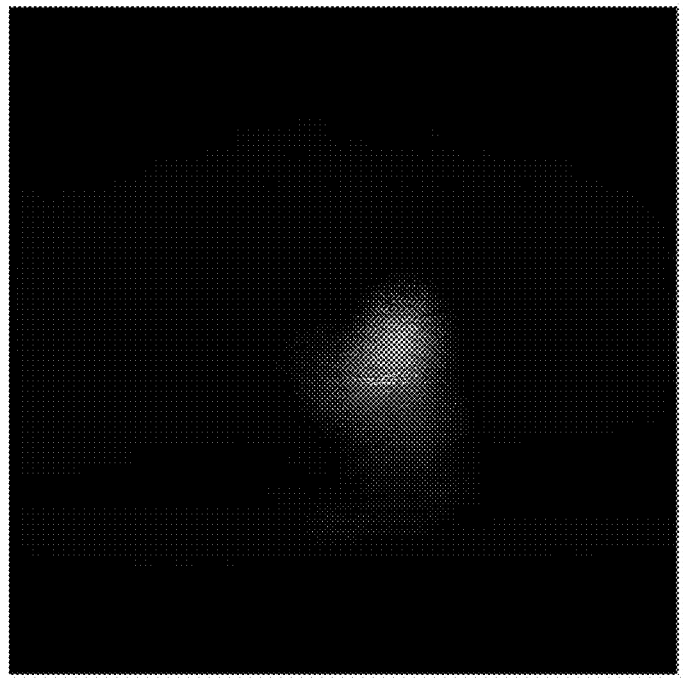
FIG. 9A illustrates a collection of hexagonal elemental image obtained after the application of the SPOC protocol of the present disclosure.
Figure 9B:
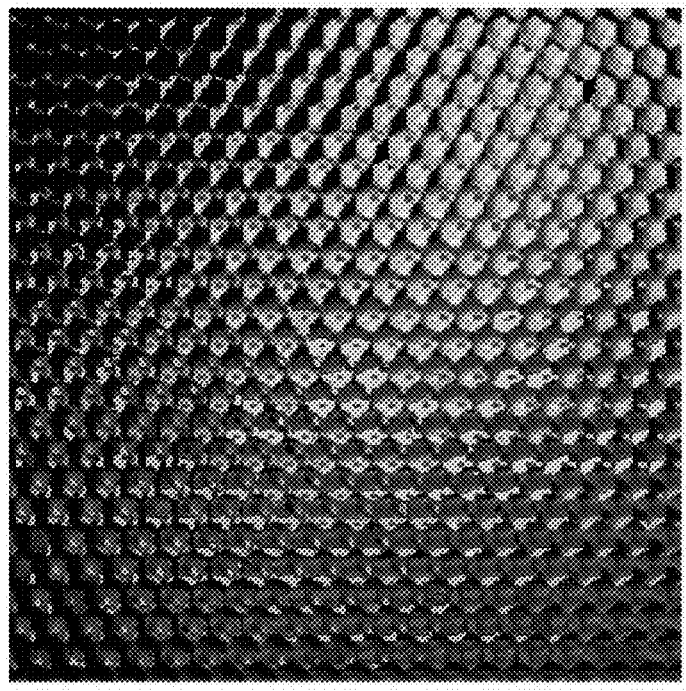
FIG. 9B illustrates an enlarged view of some of the central synthetic elemental images.

FIG. 9A shows a collection of hexagonal elemental images obtained after the application of the SPOC protocol. FIG. 9B is an enlarged view of some central SEIs in FIG. 9A.

Figure 10A:
FIG. 10A and FIG. 10B illustrate two perspectives of the result of a simulated visualization experiment as would be seen by a virtual observer placed at a distance L=700 mm from the MLA.
Figure 10B:

For the simulated visualization experiment, the calculations were done assuming a virtual observer placed at a distance L=700 mm from the MLA. FIG. 10A and FIG. 10B show the results of the visualization simulation (two perspectives). The degradations that are observed in the reconstructed image are due to the fact that there is no possibility of perfect matching between the microlenses arranged in hexagonal grid and the pixels of the matrix display, which are arranged in rectangular grid.

Figure 11:
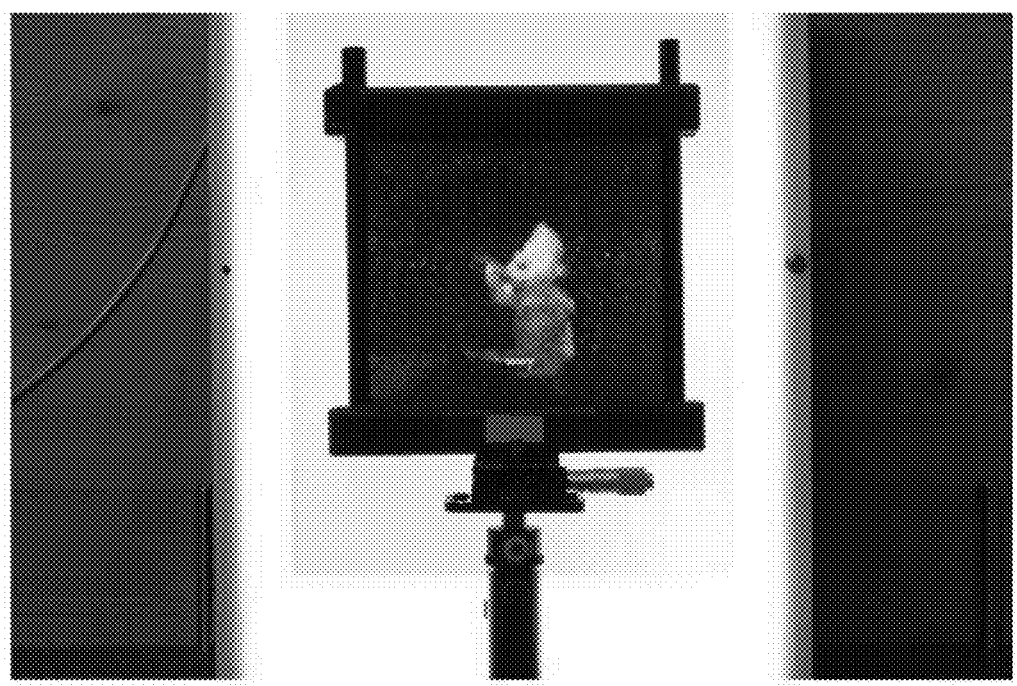
FIG. 11 illustrates an experimental set-up for the observation of the hexagonal Integral Imaging monitor, where the digital camera can be displaced horizontally in steps of 10 mm to record different perspectives of the displayed 3D scene.

Also in this case, the optical visualization experiments were performed. The SEIs were printed on photographic paper. The InI monitor was equipped with an array of microlenses, of diameter $\phi_S=1.0$ mm and $f=3.0$ mm arranged in hexagonal grid. Then the SEIs were placed at a distance of g=3.0 mm from the MLA, as shown in FIG. 11.

Figure 12A:
FIG. 12A and FIG. 12B illustrate two captured perspectives of the 3D scene photographed by the digital camera in FIG. 11.
Figure 12B:

Up to 35 different perspectives of the displayed 3D image were captured with a digital camera placed at L=700 mm. The camera was moved in the horizontal direction in steps of 10 mm. The captured perspectives (two perspectives) of the 3D scene are shown in FIG. 12A and FIG. 12B.

It is interesting to note how the SPOC affects the resolution of reconstructed images. There is no single response, since it depends on the protocol parameter. Since it is not possible to increment the image bandwidth through rearrangement of pixel information, no increment of image resolution is possible with SPOC. To avoid loss of resolution, the parameters of the protocol should be carefully selected.

A different issue is the resolution of the reconstructed image as observed when the observer's eye looks at the display. Such viewing resolution is mainly determined by the microlenses pitch. In this case, it can be stated that the proper use of SPOC can help to increment significantly the viewing resolution.

SPOC can be used for production of realistic 3D images that can be observed without the need for special glasses or goggles. The SPOC protocol overcomes the structural differences between the capture setup (an array of digital cameras) and display monitor (e.g., a commercial MP4 device).

SPOC can be applied for elemental image calculation/creation to a wide range of 3D monitors, such as cellular phones, tablets, and large-screen billboards.

As used in this application, "Integral imaging" is the name of the imaging technique, "Elemental image" is the image obtained through the corresponding microlens, and "Integral image" is the array of elemental images.

The method for the transformation of a pseudoscopic image to an orthoscopic image for three-dimensional (3D) viewing, comprising: creating synthetic elemental images (SEIs) by a protocol with the SEIs being fully adapted to an Integral Imaging (InI) display monitor, and the protocol comprising the following sequence of events: simulated display; synthetic capture; and homogeneous scaling can have additional features. The method protocol can be smart pseudoscopic to orthoscopic conversion (SPOC). The simulated display can have an input that is an array of elemental images captured experimentally, and the capture of the elemental images can be by a digital camera that can be mechanically shifted, by a microlens array or by a pinhole array. Further, the synthetic capture can be achieved through an array of pinholes (PA), and the PA can be a synthetic PA that is placed at an arbitrary distance from a display microlens array (MLA), and the synthetic capture can further comprise a pitch and a gap to said synthetic PA, with the pitch and the gap each assigned a value that is arbitrarily selected. Also, the synthetic capture can further comprise pixels, with the number of pixels per synthetic elemental image being an arbitrarily fixed number of pixels. Further, the homogeneous scaling can comprise scaling the size of said SEIs to said InI display monitor, and the method can further comprise a pitch and a gap that are each scaled by the same factor and, also, the value of the scaled gap can be equal to the focal length of a microlens of the InI display monitor. Still further, the transformation can achieve full control of display parameters selected from the group consisting of pitch, focal length, size of microlens array, depth position, size of reconstructed images, microlens array geometry, and any combinations thereof. Also, the microlens array geometry is rectangular or hexagonal. Yet further, the transformation can address structural differences between a capture setup and the InI display monitor when projecting integral images in the InI display monitor. Still further, the transformation can achieve enhanced focal distance and depth perception, to reduce visual fatigue of an observer. The method for calculation of a pixel of a synthetic elemental image (SEI) used in transformation of a pseudoscopic image to an orthoscopic image for three-dimensional (3D) viewing, further comprises identifying a pixel of a captured integral image that maps to said pixel of said SEI.

The present disclosure envisions combinations of the methods of the above paragraph and, in addition, a system for the display of any of the three-dimensional images, obtained by any of the above methods. The displayed image is seen by the observer without suffering visual fatigue. The system is composed by a pixelated display and a microlens array set parallel to it. The present disclosure further envisions an opto-electronic device for the display of three-dimensional images that comprises this display system. Further, the opto-electronic device for the display of three-dimensional images can have the pixelated display composed by LCD cells, or LED, or OLED, or ultra-bright LED or any other pixelated displays. Still further, the opto-electronic device for the display of three-dimensional images described above can have the device selected from the group consisting of cellular phone, or a smart phone, or a tablet, or a MP4 device, or a computer monitor, or a TV screen, or a large-screen billboard or any other similar opto-electronic device. Yet further, the system can have the microlens pitch built so that the angular size of any microlens, as seen from the observer position, is preferably equal or less than 0.001 rad. The number of pixels illuminating each microlens should be preferably greater or equal than 12.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the disclosure.

What is claimed is:

1. A method for the transformation of a pseudoscopic image to an orthoscopic image for three-dimensional (3D) viewing, comprising:
    creating synthetic elemental images (SEIs) by a protocol, said SEIs being fully adapted to an Integral Imaging (InI) display monitor,
    wherein said protocol comprises the following sequence of events:
        simulated display;
        synthetic capture; and
        homogeneous scaling, and
    wherein said transformation results in an orthoscopic image for 3D viewing; and
    wherein calculation of a pixel of a SEI used in said transformation comprises:
        identifying a pixel of a captured integral image that maps to said pixel of said SEI; and
        back-projecting a coordinate, $x_S$, of the center of said pixel of said SEI through its corresponding pinhole, wherein said coordinate, $x_S$, of said pixel is calculated by:

$$x_S = jp_S + m\frac{p_S}{n_S},$$

wherein $p_S$ is an assigned value for a pitch, $n_S$ is the assigned value for the total number of pixels that compose the SEI, and $x_S$ is the center of the $m^{th}$ pixel of the $j^{th}$ SEI.

2. The method according to claim 1, wherein said protocol is smart pseudoscopic to orthoscopic conversion (SPOC).

3. The method according to claim 1, wherein said simulated display has an input that is an array of elemental images captured experimentally, and wherein said capture of said elemental images is by a digital camera that can be mechanically shifted, by a microlens array or by a pinhole array.

4. The method according to claim 1, wherein said synthetic capture is achieved through an array of pinholes (PA), and wherein said PA is a synthetic PA that is placed at an arbitrary distance from a display microlens array (MLA).

5. The method according to claim 4, wherein said synthetic capture further comprises a pitch and a gap to said synthetic PA and wherein said pitch and said gap are each assigned a value that is arbitrarily selected, or wherein said synthetic capture further comprises pixels and wherein the number of said pixels per synthetic elemental image is an arbitrarily fixed number of pixels.

6. The method according to claim 1, wherein said homogeneous scaling comprises scaling the size of said SEIs to said InI display monitor, further comprises a pitch and a gap that are each scaled by a same factor, wherein the value of said scaled gap is equal to the focal length of a microlens of said InI display monitor.

7. The method according to claim 1, wherein said transformation achieves full control of display parameters selected from the group consisting of pitch, focal length, size of microlens array, depth position and size of reconstructed images, microlens array geometry, and any combinations thereof, wherein said microlens array geometry is rectangular or hexagonal.

8. The method according to claim 1, wherein said transformation addresses structural differences between a capture setup and said InI display monitor when projecting integral images in said InI display monitor.

9. A method for calculation of a pixel of a synthetic elemental image (SEI) used in transformation of a pseudoscopic image to an orthoscopic image for three-dimensional (3D) viewing, comprising:
    identifying a pixel of a captured integral image that maps to said pixel of said SEI; and
    back-projecting a coordinate, $x_S$, of the center of said pixel of said SEI through its corresponding pinhole, wherein said coordinate, $x_S$, of said pixel is calculated by:

$$x_S = jp_S + m\frac{p_S}{n_S},$$

wherein $p_S$ is an assigned value for a pitch, $n_S$ is the assigned value for the total number of pixels that compose the SEI, and $x_S$ is the center of the $m^{th}$ pixel of the $j^{th}$ SEI.

10. The method according to claim 9, wherein said back-projection through said pinhole permits calculation of an intersection with a reference plane, wherein said intersection, $\Delta_0$, with said reference plane is calculated by:

$$\Delta_o = \left(1 + \frac{d_S}{g_S}\right)jp_S - \frac{d_S}{g_S}x_S,$$

wherein $d_S$ is the distance between said reference plane and a synthetic capture device, and $g_S$ is an assigned value for a gap to a synthetic PA.

11. The method according to claim 9, wherein said back-projection through said pinhole permits calculation of an interface with a display MLA, wherein said intersection, $\Delta_D$, with said display MLA is calculated by:

$$\Delta_D = \left(1 + \frac{D}{g_S}\right)jp_S - \frac{D}{g_S}x_S,$$

wherein D is an assigned distance from said pinhole to said display MLA and $g_S$ is an assigned value for a gap to a synthetic PA.

12. The method according to claim 9, further comprising using a capture microlens having an index $i_{jm}$ that is calculated by:

$$i_{jm} = \text{Round}\left[-\frac{D}{p_D g_S}\left(jp_S + m\frac{p_S}{n_S}\right) + \frac{g_S + D}{p_D g_S}jp_S\right]$$
$$= \text{Round}\left[\frac{p_S}{p_D}j - \frac{p_S}{p_D}\frac{D}{g_S}\frac{m}{n_S}\right],$$

wherein $p_D$ is an assigned value for a pitch in a simulated display; $p_S$ is the pitch of the synthetic PA; $g_S$ is the gap used in the synthetic capture; D is the distance between the simulated MLA and the synthetic PA; $n_S$ is the number of pixels of any SEI; m is a counter that names the $m^{th}$ pixel of any synthetic SEI; and j is a counter naming the $j^{th}$ pinhole of the array.

13. The method according to claim 12, further comprising calculating the coordinate, $x_D$, of the point that is the conjugate, through the impact microlens, of point $\Delta_0$ by:

$$x_D = \left(1 + \frac{g_D}{D - d_S}\right) p_D i_{jm} - \frac{g_D}{g_S} \frac{g_S + d_S}{D - d_S} j p_S + \frac{g_D}{g_S} \frac{d_S}{D - d_S} x_S,$$

wherein $g_D$ is the gap used in the captured elemental image.

14. The method according to claim 13, further comprising calculating an index of the $l^{th}$ pixel within the $i^{th}$ elemental cell by:

$$l_{jm} = \text{Round}\left[\frac{g_D}{D - d_S} n_D i_{jm} + \frac{g_D}{g_S} \frac{p_S}{p_D} \frac{n_D}{D - d_S}\left(d_S \frac{m}{n_S} - j p_S\right)\right],$$

wherein $n_D$ is the assigned value for the total number of pixels that compose the elemental images captured experimentally, wherein the pixel value of said SEI from the captured integral image by mapping is by:

$$I_{jm}{}^S = I_{i1}{}^D,$$

wherein $I_{jm}{}^S$ is the pixel value of the $m^{th}$ pixel within the $j^{th}$ elemental SEI, and $I_{i1}{}^D$ is the pixel value for the $l^{th}$ pixel within the $i^{th}$ elemental image captured experimentally.

15. A method for the transformation of a pseudoscopic image to an orthoscopic image for three-dimensional (3D) viewing, comprising:
   creating synthetic elemental images (SEIs) by a protocol, said SEIs being fully adapted to an Integral Imaging (InI) display monitor,
   wherein said protocol comprises the following sequence of events:
      simulated display;
      synthetic capture; and
      homogeneous scaling,
   wherein said transformation results in an orthoscopic image for 3D viewing; and
   wherein calculation of a pixel of a SEI used in said transformation comprises:
      identifying a pixel of a captured integral image that maps to said pixel of said SEI; and
      back-projecting a coordinate, $x_S$, of the center of said pixel of said SEI through its corresponding pinhole, wherein said coordinate, $x_S$, of said pixel is calculated by:

$$x_S = j p_S + m \frac{p_S}{n_S},$$

wherein $p_S$ is an assigned value for a pitch, $n_S$ is the assigned value for the total number of pixels that compose the SEI, and $x_S$ is the center of the $m^{th}$ pixel of the $j^{th}$ SEI;
   wherein said back-projection through said pinhole permits calculation of an intersection with a reference plane, wherein said intersection, $\Delta_0$, with said reference plane is calculated by:

$$\Delta_o = \left(1 + \frac{d_S}{g_S}\right) j p_S - \frac{d_S}{g_S} x_S,$$

wherein $d_S$ is the distance between said reference plane and a synthetic capture device, and $g_S$ is an assigned value for a gap to a synthetic PA; and
   wherein said back-projection through said pinhole permits calculation of an interface with a display MLA, wherein said intersection, $\Delta_D$, with said display MLA is calculated by:

$$\Delta_D = \left(1 + \frac{D}{g_S}\right) j p_S - \frac{D}{g_S} x_S,$$

wherein D is an assigned distance from said pinhole to said display MLA and $g_S$ is an assigned value for a gap to a synthetic PA.

* * * * *